United States Patent [19]

Haraga et al.

[11] 4,414,257
[45] Nov. 8, 1983

[54] ELEVATOR PANEL

[75] Inventors: Kousuke Haraga, Hyogo; Katsutoshi Hattori, Aichi, both of Japan

[73] Assignees: Mitsubishi Denki Kabushiki Kaisha; Denki Kagaku Kogyo Kabushiki Kaisha, both of Tokyo, Japan

[21] Appl. No.: 281,626

[22] Filed: Jul. 9, 1981

[51] Int. Cl.$^3$ .............................................. B32B 3/28
[52] U.S. Cl. ..................................... 428/182; 52/801; 428/594
[58] Field of Search ................... 52/795, 801; 428/594, 428/603, 117, 178, 182, 188, 179; 181/284, 290

[56]          References Cited
          U.S. PATENT DOCUMENTS

| | | | |
|---|---|---|---|
| 1,625,061 | 4/1927 | Trout | 52/795 |
| 2,101,836 | 12/1937 | Benedict | 428/182 |
| 2,234,517 | 3/1941 | Coffman | 428/182 |
| 2,258,858 | 10/1941 | Meadowcroft | 428/594 |
| 2,423,870 | 7/1947 | Blessing | 428/182 |
| 2,636,968 | 4/1948 | Watter | 52/801 |
| 2,796,157 | 6/1957 | Ginsburg | 428/179 |
| 2,963,128 | 12/1960 | Rapp | 428/182 |
| 3,439,466 | 4/1969 | Schreyer | 52/795 |
| 3,840,423 | 10/1974 | Bemrose et al. | 428/182 |
| 4,096,201 | 6/1978 | Kishi et al. | |
| 4,197,341 | 4/1980 | Rule | 428/182 |

FOREIGN PATENT DOCUMENTS 2830776  1/1980  Fed. Rep. of Germany ........ 52/801

OTHER PUBLICATIONS

"Second-Generation Acrylic Adhesives", Adhesives Age, Sep. 1976.

Primary Examiner—L. Dewayne Rutledge
Assistant Examiner—J. J. Limmerman
Attorney, Agent, or Firm—Sughrue, Mion, Zinn, Macpeak and Seas

[57] ABSTRACT

A panel for an elevator composed of a surface plate and a corrugated reinforcing member having ridges facing the surface plate with the surface plate and the corrugated reinforcing member being joined to each other by a room temperature curing modified acrylate adhesive of a two-part non-solvent type applied in flat layers in an unmixed condition to the entire crest of the ridges and surface portions of the surface plate facing the ridges. The elevator panel thus formed retains the adhesive in a satisfactorily cured condition with a high level of adhesive strength while providing a greatly improved level of soundproofing and damping as well as ease of fabrication.

4 Claims, 11 Drawing Figures

ELEVATOR PANEL

BACKGROUND OF THE INVENTION

The present invention relates to an elevator panel having a surface plate and a corrugated reinforcing member joined to the surface plate. A known panel used to form the wall or door of an elevator includes a metal surface plate and a plurality of reinforcing steel members joined thereto. The surface plate and the reinforcing members are joined to each other by welding, with or without the aid of an adhesive.

If the surface plate and the reinforcing members are joined by welding, however, it is impossible to avoid distortion of the material in the welded joint. This distortion must be carefully removed to provide a flat and distortion-free surface which is required of a panel for an elevator. Moreover, much labor is required for smoothing the panel surface when an undercoat of paint is applied thereto. If welding with the aid of an adhesive is employed, it suffices to weld the surface plate and the reinforcing members at fewer places than when only welding is relied upon. This, however, brings about only some reduction in the work needed for removing distortion of the material by welding, and not the total elimination thereof.

The adhesive used for the purpose is typically a one-pack epoxy resin adhesive of the heat curing type or a two-pack epoxy resin adhesive of the room temperature curing type. For curing a one-pack epoxy resin adhesive, it is necessary to heat it at a high temperature of, for instance, 120° C. to 200° C. for about 10 to 40 minutes. A corresponding amount of heat energy and a satisfactory heating apparatus are required. A two-pack epoxy resin adhesive requires precise metering and mixing of its principal component and the curing agent. Once they have been mixed, the adhesive thereby prepared need be used within its pot life. It usually requires a period of as long as several hours to one day in order to obtain the intended strength at room temperature. As it is necessary provide heating in order to shorten the curing time, a corresponding amount of heat energy and an appropriate heating apparatus are required.

Although the elevator panel thus fabricated has a sufficiently high strength, it is still not satisfactory in soundproofing and vibration damping properties during the operation of the elevator. In order to improve its soundproofing and damping properties, it is necessary to apply a soundproofing paint onto the entire rear surface of the panel. An apparatus for applying a soundproofing paint and an oven for drying the paint are therefore required.

SUMMARY OF THE INVENTION

Overcoming these difficulties, the invention provides a greatly improved elevator panel having high damping and soundproofing properties. It includes a surface plate and a corrugated reinforcing member having ridges facing the surface plate. The surface plate and the reinforcing member are joined to each other by a room temperature curing modified acrylate adhesive of the two-part non-solvent type applied to the entire opposing surfaces of the surface plate and the reinforcing member in flat layers in which the two parts of the adhesive are not mixed, whereby it is possible to maintain a satisfactorily cured state of the adhesive and a high degree of adhesion between the surface plate and the reinforcing member. In this case, the adhesive is applied to the entire opposing surfaces of the surface plate and the reinforcing member in such a manner that (1) one of the two parts of the adhesive is coated on the entire surface of the surface plate in an appropriate manner whereas the other of the two parts of the adhesive is coated on the entire surface of the reinforcing member in an appropriate manner, and vice versa; and alternatively, (2) one of the two parts of the adhesive is coated on the entire surface of either the surface plate or the reinforcing member and the other of the two parts of the adhesive is then coated on the coating layer previously coated.

BRIEF DESCRIPTION OF THE DRAWINGS

FIGS. 1 to 3 show a first preferred embodiment of an elevator panel of the invention of which FIG. 1 is a perspective view of a reinforcing member, FIG. 2 is a perspective view of the overall elevator panel, and FIG. 3 is a view illustrating a process for joining the reinforcing member and the surface plate;

DESCRIPTION OF THE PREFERRED EMBODIMENTS

Figure 1:
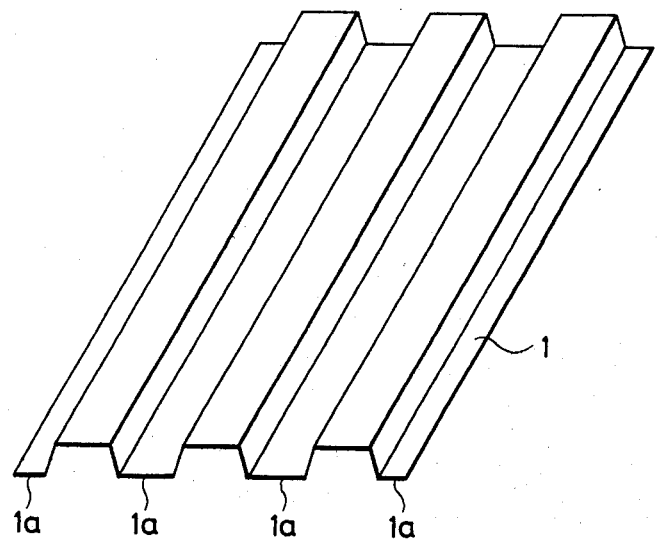
Figure 2:
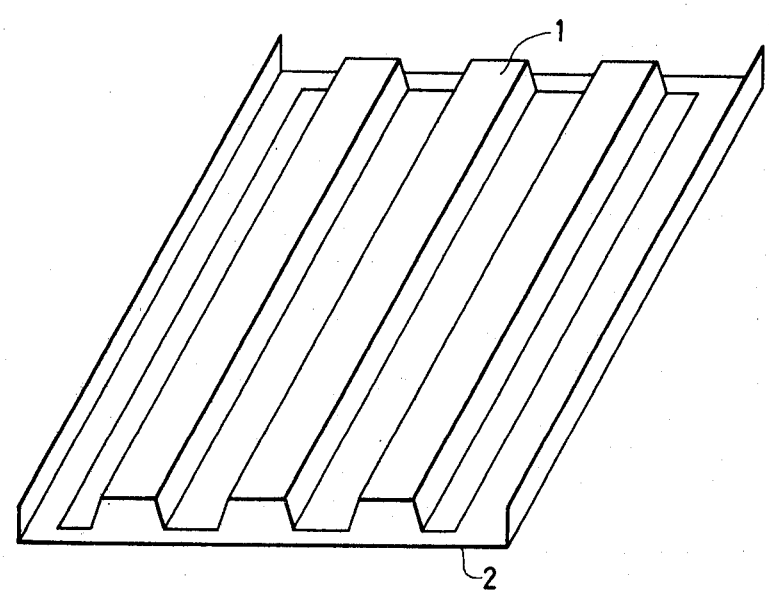
Figure 3:
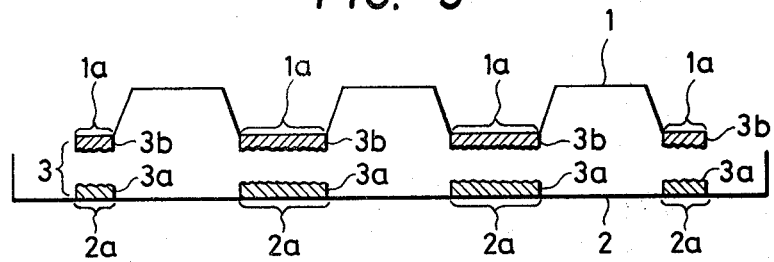

The invention will now be described with reference to FIGS. 1 to 3 showing a preferred embodiment thereof. A corrugated reinforcing member 1 has ridges 1a at which it is joined to a surface plate formed from a thin plate selected from among, for example, a steel plate, a galvanized iron plate, a tin plate, a colored galvanized iron plate, a steel plate electroplated with zinc, an aluminized steel plate, a polyvinyl chloride coated steel plate, an aluminum plate and a stainless steel plate. The surface plate 2, which is made of metal, has surface portions 2a each of which faces one of the ridges on the reinforcing member 1 and at which the surface plate 2 is joined to the reinforcing member. The surface plate 2 is formed from a steel plate, a polyvinyl chloride coated steel plate, a stainless steel plate, a galvanized iron plate, a steel plate electroplated with zinc, or the like. The ridges 1a of the reinforcing member 1 and the surface portions 2a of the surface plate 2 are joined to each other by a room temperature curing modified acrylate adhesive of the two-part non-solvent type. This adhesive is composed of a liquid composition A consisting mainly, for example, of unvulcanized rubber and acrylate, and a composition B consisting mainly of a liquid organic compound having an unsaturated double bond and capable of causing a curing reaction by a radical. Each of the compositions A and B contains either a compound which promotes the decomposition of an organic peroxide and facilitates radical formation, or an organic peroxide. The adhesive is a two-part non-solvent type adhesive in which neither the composition A nor B contains both any such compound promoting the decomposition of an organic peroxide and facilitating radical formation and any such organic peroxide. The composition B does not necessarily need to contain an organic compound having an unsaturated double bond, but may instead be one containing either an organic peroxide, or a compound which promotes the decomposition of any such organic peroxide and facilitates radical formation.

The room temperature curing acrylate adhesive of the two-part non-solvent type has the following advantages:

(1) As opposed to an epoxy resin adhesive, it is not necessary to mix the principal component and the curing agent uniformly. It is sufficient to merely bring the two parts into contact in order to cure the adhesive.

(2) The adhesive has no pot life limitation since its components do not need to be mixed prior to application;

(3) As opposed to an epoxy resin adhesive, it is not necessary to meter the principal component and the curing agent precisely, but complete curing can be achieved with little difference in adhesive strength, even if the proportions of the two components vary greatly;

(4) It provides a high level of working efficiency since it cures in a short time of, for example, five to ten minutes at room temperature, and does not require any heating equipment;

(5) It has a strong adhesive force for any kind of material, and its adhesive strength is not affected by the presence of oil or fat on the materials to be joined;

(6) The adhesion produced by this adhesive not only has a high shear strength, but also high peeling and impact resistances; and (7) The resin which it contains is highly flexible and resistant to vibration and fatigue compared with an epoxy resin adhesive or the like.

The process by which the elevator panel of the invention is fabricated will now be described.

One component 3a of a room temperature curing modified acrylate adhesive 3 of the two-part non-solvent type is applied in a thin flat layer to each surface portion 2a of the surface plate 2, while the other component 3b is likewise applied in a thin flat layer to the entire crest of each ridge 1a of the reinforcing member 1. The ridges 1a and the surface portions 2a are aligned with each other and maintained in contact with each other under pressure for five to ten minutes, whereby the reinforcing member 1 is joined to the surface plate 2 to provide an elevator panel.

The process as hereinabove described does not give rise to any distortion of the materials which have been joined, and does not require any labor of the sort which is required for removing distortion when the fabrication is performed by welding. No heating of the adhesive 3 is required for curing it. As opposed to a two-part epoxy resin adhesive, it does not require any precise metering or mixing, and has no pot life limitation. The adhesive maintains a satisfactorily cured state and a high level of adhesive strength. As the reinforcing member 1 has a wide area of adhesion to the surface plate 2, the elevator panel has high level soundproofing and damping properties and does not require application of any soundproofing paint.

Each of the two components 3a and 3b of the adhesive 3 is applied in a layer having a thickness preferably not exceeding 1 mm, and more preferably not exceeding 0.5 mm. When the reinforcing member 1 and the surface plate 2 have been joined to each other, each adhesive layer has a thickness which is preferably not greater than 0.5 mm, and more preferably in the range of 0.1 to 0.3 mm. The proportion of the two components 3a and 3b can locally vary to a considerable extent, but is preferably in the range of 1:1.5 to 1.5:1. The layers of the adhesive 3 do not need to be precisely flat but may be uneven. It is, however, preferable that they have as flat a surface as possible.

Figure 4:
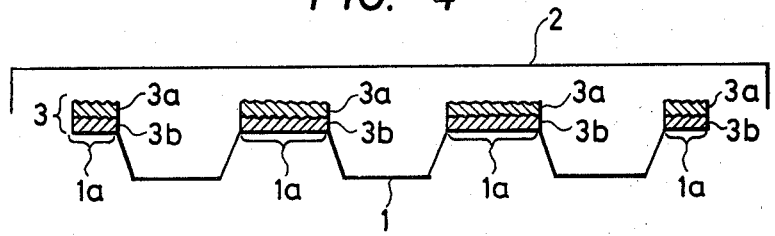
FIGS. 4 and 5 show further embodiments of elevator panels of the invention and illustrate the process for joining a reinforcing member and a surface plate.
Figure 5:
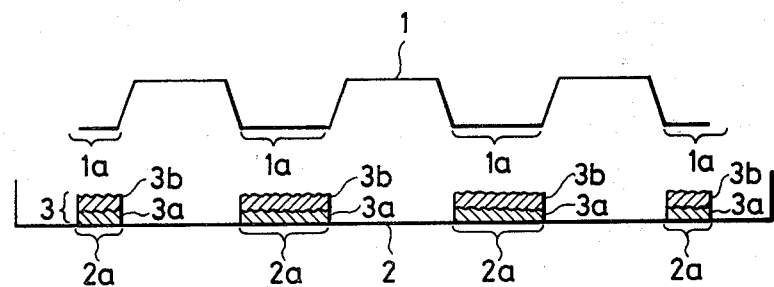

Reference will now be made to FIGS. 4 and 5 showing other embodiments of the invention. According to the embodiment of FIG. 4, one component 3b of the adhesive 3 is applied in a thin flat layer to the entire crest of each ridge 1a of the reinforcing member 1 and then the other component 3a is applied in a thin flat layer onto the whole surface of each layer of the component 3b. The surface plate 2 is brought into contact with the layers of the component 3a, whereby the reinforcing member 1 and the surface plate 2 are joined to each other. According to the arrangement shown in FIG. 5, one component 3a of the adhesive 3 is applied in a thin flat layer to each surface portion 2a of the surface plate 2, and then the other component 3b is applied in a thin flat layer onto the whole surface of each layer of the component 3a. The ridges 1a of the reinforcing member 1 are brought into contact with the layers of the component 3b whereby the reinforcing member 1 and the surface plate 2 are joined to each other. Both of the embodiments shown in FIGS. 4 and 5 provide the same advantages as those which can be obtained from the embodiment described with reference to FIGS. 1 to 3.

The invention will now be described more specifically with reference to examples, including comparative examples, as shown in FIGS. 6 to 11.

In FIGS. 6 to 11, numeral 4 designates a member corresponding to the reinforcing member 1 and which is made from a galvanized iron plate having a thickness of 0.3 mm a width of 25 mm and a length of 200 mm. Reference numeral 5 designates a plate corresponding to the surface plate 2 and which is a polyvinyl chloride coated steel plate having a thickness of 1.2 mm, a width of 25 mm and a length of 200 mm. The plate 5 has one surface coated with polyvinyl chloride. The reinforcing member 4 is joined to the other surface, which is not coated with polyvinyl chloride, of the plate 5.

The reinforcing member 4 and the plate 5 were joined to each other by adhesive 3 in such a manner that they had a 0.2 mm thick adhesive layer therebetween. Each of the joints thus obtained was tested for adhesive strength in accordance with the requirements of DIS 4578 specified by ISO (Adhesives—Measurement of Peeling Resistance of Strong Adhesive Joints—Floating Roller Method) by using a tensile tester having a cross-head speed of 100 mm/min. The adhesive strength was measured at room temperature 24 hours after the reinforcing member and the surface plate had been joined, and the cured state of the adhesive was observed after the joint had been separated.

EXAMPLE 1

Figure 6:
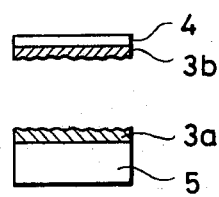
FIGS. 6 to 8 illustrate examples of this invention and FIGS. 9 to 11 illustrate comparative examples.

Hard Loc C-351 (product of Denki Kagaku Kogyo K.K.) was used as the room temperature curing modified acrylate adhesive 3 of the two-part non-solvent type. Composition A (3a) of Hard Loc C-351 was applied in a flat layer having a thickness of about 0.5 mm onto the whole surface of the polyvinyl chloride coated steel plate 5, and Composition B (3b) of Hard Loc C-351 was applied in a flat layer having a thickness of about 0.5 mm onto the whole surface of the galvanized iron plate 4, as shown in FIG. 6. The joint thus obtained had an adhesive strength of 8.8 kg/25 mm, and the adhesive was found to be in a completely cured condition.

EXAMPLE 2

Figure 7:
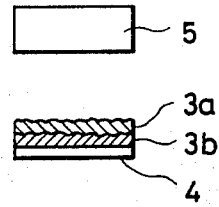

Hard Loc C-351 was used as the adhesive 3. Composition B (3b) of Hard Loc C-351 was applied in a flat layer having a thickness of about 0.5 mm onto the whole surface of the galvanized iron plate 4. Then, Composition A (3a) of Hard Loc C-351 was applied in a flat layer having a thickness of about 0.5 mm onto the layer of Composition B (3b) as shown in FIG. 7. Then, the polyvinyl chloride coated steel plate 5 was placed on the layer of Composition A (3a) whereby the plates 4 and 5 were joined to each other. The joint thus obtained had an adhesive strength of 8.8 kg/25 mm, and the adhesive was found to be in a completely cured condition.

EXAMPLE 3

Figure 8:
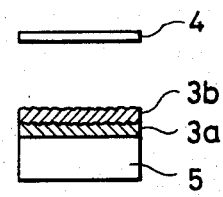

Hard Loc C-351 was used as the adhesive 3. Composition A (3a) of Hard Loc C-351 was applied in a flat layer having a thickness of about 0.5 mm onto the whole surface of the polyvinyl chloride coated steel plate 5. Then, Composition B (3b) of Hard Loc C-351 was applied in a flat layer having a thickness of about 0.5 mm onto the layer 3a as shown in FIG. 8. Next, the galvanized iron plate 4 was placed on the layer 3b of Composition B whereby the plates 4 and 5 were joined to each other. The joint thus obtained had an adhesive strength of 8.7 kg/25 mm, and the adhesive was found to be in a completely cured condition.

COMPARATIVE EXAMPLE 1

Hard Loc C-351 was used as the adhesive 3. Composition A (3a) and Composition B (3b) of Hard Loc C-351 were dropped in equal quantities onto the polyvinyl chloride coated steel plate 5. After they had been mixed together, the galvanized iron plate 4 was joined to the plate 5. The joint thus obtained had an adhesive strength of 8.6 kg/25 mm, and the adhesive was found to be in a completely cured condition.

COMPARATIVE EXAMPLE 2

Figure 9:
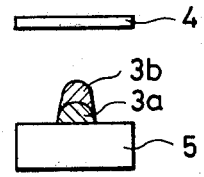

Hard Loc C-351 was used as the adhesive 3. A bead of Composition A (3a) of Hard Loc C-351 was applied onto the polyvinyl chloride coated steel plate 5, and an equal quantity of Composition B (3b) in a bead was applied onto the bead of Composition A (3a) as shown in FIG. 9. Then, the galvanized iron plate 4 was joined to the plate 5. The joint thus obtained had an adhesive strength of 7.6 kg/25 mm, which is lower than which had been obtained in Examples 1 to 3. The adhesive was partly found to be in an incompletely cured condition.

COMPARATIVE EXAMPLE 3

Figure 10:
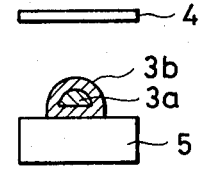

Hard Loc C-351 was used as the adhesive 3. It was applied to the polyvinyl chloride coated steel plate 5 in the form of a bead in which Composition A (3a) was enclosed in Composition B (3b) as shown in FIG. 10. Then, the galvanized iron plate 4 was joined to the plate 5. The joint thus obtained had an adhesive strength of 6.6 kg/25 mm, which was even lower than what had been obtained in Comparative Example 2. A considerably great portion of the adhesive was found to be in an incompletely cured condition.

COMPARATIVE EXAMPLE 4

Figure 11:
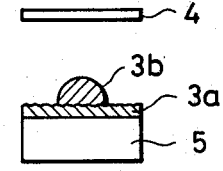

Hard Loc C-351 was used as the adhesive 3. Composition A (3a) of Hard Loc C-351 was applied in a flat layer having a thickness of about 0.5 mm onto the whole surface of the polyvinyl chloride coated steel plate 5. Then, an equal quantity of Composition B was applied in a bead 3b on the layer 3a as shown in FIG. 11. Then, the galvanized iron plate 4 was joined to the plate 5. The joint thus obtained had an adhesive strength of 4.7 kg/25 mm, which was much lower than what had been obtained in Comparative Example 3. A considerable portion of the adhesive was found to be in an incompletely cured condition.

As is evident from the foregoing description of Examples of this invention and Comparative Examples, a high level of adhesive strength and satisfactory curing of the adhesive can be obtained only when the components of the adhesive are applied in flat, unmixed layers to the whole surface portions at which the materials to be joined are brought into contact with each other.

According to the invention, there is provided a panel of an elevator composed of a surface plate and a corrugated reinforcing member having ridges facing the surface plate. The surface plate and the corrugated reinforcing member are joined to each other by a room temperature curing modified acrylate adhesive of the two-part non-solvent type applied in flat layers in an unmixed condition to the entire crests of the ridges and surface portions of the surface plate facing the ridges, as hereinabove described. The elevator panel of this invention retains the adhesive in a satisfactorily cured condition and at a high level of adhesive strength, has a greatly improved level of soundproofing and damping properties, and is easy to fabricate.

What is claimed is:

1. A panel for an elevator comprising: a surface plate, and a corrugated reinforcing member having ridges facing said surface plate, said surface plate and said corrugated reinforcing member being joined to each other by a room temperature curing acrylate adhesive of a two-part non-solvent type applied in flat layers in an unmixed condition to entire crests of said ridges and surface portions of said surface plate facing said ridges.

2. The panel for an elevator as set forth in claim 1, wherein said reinforcing member is formed from a thin plate selected from among a steel plate, a galvanized iron plate, a tin plate, a colored galvanized iron plate, a steel plate electroplated with zinc, an aluminized steel plate, a polyvinyl chloride coated plate, an aluminum plate and a stainless steel plate, and said surface plate is formed from a plate selected from a steel plate, a polyvinyl chloride coated steel plate, a stainless steel plate, a galvanized iron plate, and a steel plate electroplated with zinc.

3. The panel for an elevator as set forth in claim 1 or 2, wherein a first of two parts of said adhesive is applied in flat layers to at least one of said entire crests and said surface portions of said surface plate, while the other part of said adhesive is applied in a flat layer to the entire surface of each of said layers of said first part.

4. The panel for an elevator as set forth in claim 1 or claim 2, wherein one of two parts of said adhesive is applied in flat layers to said entire crests, and the other part of said adhesive is applied in flat layers to said surface portions of said surface plate.

* * * * *